(12) United States Patent
Iino et al.

(10) Patent No.: US 6,627,689 B2
(45) Date of Patent: Sep. 30, 2003

(54) ELECTROCONDUCTIVE CURABLE RESIN COMPOSITION, CURED PRODUCT THEREOF AND FORMED PRODUCT USING THE COMPOSITION

(75) Inventors: Tadashi Iino, Kawasaki (JP); Mitsuhiro Imaizumi, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/890,233

(22) PCT Filed: Jun. 5, 2001

(86) PCT No.: PCT/JP01/04751
§ 371 (c)(1),
(2), (4) Date: Jul. 30, 2001

(87) PCT Pub. No.: WO01/95344
PCT Pub. Date: Dec. 13, 2001

(65) Prior Publication Data
US 2003/0013798 A1 Jan. 16, 2003

(30) Foreign Application Priority Data

Jun. 5, 2000 (JP) ......................................... 2000-166965
Apr. 12, 2001 (JP) ......................................... 2001-113764

(51) Int. Cl.$^7$ ............................. C08J 5/10; C08K 3/38; C08L 63/04
(52) U.S. Cl. ........................ 524/404; 524/495; 524/496
(58) Field of Search ................... 524/495, 404, 524/496; 96/189; 523/445

(56) References Cited

U.S. PATENT DOCUMENTS 4,414,142 A * 11/1983 Vogel et al. ................. 252/506
6,150,446 A * 11/2000 Numata ....................... 524/406

FOREIGN PATENT DOCUMENTS

EP   0 081 004 A   6/1983

OTHER PUBLICATIONS

Database Chemabs, "Ambient and high temperature experiments on boron–doped polycrystalline graphites," Paul Wagner, et al., (abstract 73:113816 for Carbon, 8(3), 313–20, 1970).

* cited by examiner

Primary Examiner—James J. Seidleck
Assistant Examiner—U. K. Rajguru
(74) Attorney, Agent, or Firm—Sughrue Mion, PLLC

(57) ABSTRACT

An electroconductive curable resin composition comprising (A) a graphite powder containing boron in the graphite crystal and (B) a curable resin and/or a curable resin composition, at a ratio of 20 to 99.9:80 to 0.1 in terms of the mass ratio of the component (A) to component (B); and a cured product thereof and a formed product obtained by using the curable resin composition. The cured product exhibits excellent electroconductivity even with a relatively small amount of electroconductive filler charged, and also exhibits a high heat resistance, a good heat-radiating property and superior formability or workability.

18 Claims, 2 Drawing Sheets

ELECTROCONDUCTIVE CURABLE RESIN COMPOSITION, CURED PRODUCT THEREOF AND FORMED PRODUCT USING THE COMPOSITION This application claims the priority of an application based on U.S. Provisional Application Ser. No. 60/221,924 (filed on Jul. 31, 2000).

TECHNICAL FIELD

The present invention relates to a curable resin composition. More specifically, the present invention relates to an electroconductive curable resin composition and a cured (or hardened) product thereof having not only excellent electroconductivity but also an excellent heat-radiating property.

BACKGROUND ART

The pace of recent technological innovations in the electronics industry, etc., is remarkable, and materials technology supporting the electronics industry is also making rapid progress. The same applies to the development of polymer materials and a large number of novel or high performance polymer materials have been newly developed and have individually expanded their range of uses in a steady manner.

The principal properties required for the polymer materials in the field of electronics are formability, heat resistance, durability, electrical characteristics (e.g., high insulation, high electroconductivity), corrosion resistance, heat-radiating property and the like, though these properties may vary depending on the products or uses. In many cases, for such purposes, there are used thermosetting resins represented by epoxy resins, phenolic resins, etc., or various engineering plastics represented by polyimides, polycarbonates, polyphenylene oxides and liquid crystal polymers, etc.

The demand for a material comprehensively having all of the above-mentioned various performances is of course strong, but great difficulties are present for realizing such a polymer in view of the techniques to be used therefor, and often disadvantageous results appear in view of the cost thereof. One of the technical requirements is to develop a polymer material having electroconductivity (particularly, high electroconductivity such that the volume resistivity is 1 $\Omega$cm or less) and at the same time a having heat-radiating property and heat resistance. It is an object of the present invention to develop such a material. More specific examples of the above material may include a highly electroconductive composition for use in various members to be used in the field of batteries, such as separators for fuel cells using hydrogen, alcohol or the like as the fuel therefor.

Many studies have been made in the past on highly electroconductive compositions comprising a carbonaceous material and a thermosetting resin composition. For example, a combination of graphite and a phenolic resin is disclosed in JP-B-50-11355 (the term "JP-B" as used herein means an "examined Japanese patent publication") and JP-A-59-213610 (the term "JP-A" as used herein means an "unexamined published Japanese patent application"). Also, in the case of using an epoxy resin and an unsaturated polyester resin as base resins, a plurality of techniques have been disclosed.

Further, to prepare a curable resin composition where a higher electroconductivity is required, there is known a method of forming (or shaping) the curable resin composition, and then heating so as to carbonize and graphitize the resultant formed product (see, for example, JP-A-8-222241).

When a curable resin composition containing normal graphite powder is used, the amount of graphite powder added must be greatly increased so as to provide the same electroconductivity as the cured product according to the present invention. As a result, when such a composition containing normal graphite powder is used, not only the specific gravity of the formed product disadvantageously is increased but also the formability thereof is deteriorated at the time of the formation process such as compression molding, transfer molding or injection molding. Further, in the case of a composite material comprising a combination of a resin and normal graphite powder, a cured product having a contact resistance of $2 \times 10^{-2}$ $\Omega$cm$^2$ or less could not be obtained.

If the production process includes a step of heating the formed product to a high temperature of 1,000° C. to 3,000° C. for a long time for the purpose of obtaining a high electroconductivity, there arises a problem that the production takes a long time and that the production process becomes complicated so as to increase the production cost.

DISCLOSURE OF INVENTION

The present invention has been made under these circumstances and a main object of the present invention is to provide an electroconductive curable resin composition which is capable of providing a cured product having an excellent electroconductivity, a high heat resistance, a good heat-radiating property and a superior polymer processability, even when the curable resin composition contains a relatively small amount of electroconductive filler charged therein. This object also includes providing a cured product of such a electroconductive curable resin and a formed product using the curable resin composition.

Under these circumstances, the present inventors have made extensive investigations to develop an electroconductive curable resin composition comprising, as main starting materials, a graphite powder and a curable resin or a monomer composition therefor (if desired, further containing an initiator or the like), which can provide a cured product having an excellent electroconductivity, a high heat resistance and a good heat-radiating property. As a result, an electroconductive curable resin composition and a cured product achieving the object of the present invention have been accomplished by the combination of a specific graphite containing boron with a curable resin.

More specifically, the present invention relates to an electroconductive curable resin composition, a cured product thereof and a formed product using the curable resin composition, which typically include the following embodiments (1) to (17).

(1) An electroconductive curable resin composition comprising (A) a graphite powder containing boron in the graphite crystal, and (B) a curable resin and/or a curable resin composition, at a ratio of 20 to 99.9:80 to 0.1 in terms of the mass ratio of the component (A) to component (B) provided that the sum of the mass ratios of the components (A), (B) and (C) is 100.

(2) An electroconductive curable resin composition comprising (A) a graphite powder containing boron in the graphite crystal, (B) a curable resin and/or a curable resin composition, and (C) vapor-phase process carbon fiber having a fiber diameter of 0.05–10 $\mu$m and a fiber length of 1–500 $\mu$m, and/or carbon nanotube having a fiber diameter of 0.5–100 nm and a fiber length of 0.01–10 $\mu$m.

(3) An electroconductive curable resin composition as described in the above item (2), wherein the mass ratio of the sum of the components (A) and (C) to the component (B), i.e., the mass ratio (A+C:B) is 20 to 99.9:80 to 0.1 provided that the sum of the mass ratios of the components (A), (B) and (C) is 100.

(4) An electroconductive curable resin composition as described in the above item (2) or (3), wherein the mass ratio of the component (A) to the component (C) is 60 to 99.9:40 to 0.1 provided that the sum of the mass ratios of the components provided that the sum of the mass ratios of the components (A) and (c) is 100.

(5) An electroconductive curable resin composition as described in any one of the above items (1) to (4), wherein the powder electric resistivity in the right angle direction of the graphite powder as the component (A) is 0.06 Ωcm or less with respect to the applied pressure direction, in a state where a pressure is applied to the graphite powder so as to provide a bulk density of the graphite powder of 1.5 g/cm$^3$.

(6) An electroconductive curable resin composition as described in any one of the above items (1) to (5), wherein the component (A) has an average particle size of 5 to 80 μm.

(7) An electroconductive curable resin composition as described in any one of the above items (1) to (6), wherein the component (A) is a graphite powder having a specific surface area of 3 m$^2$/g or less, an aspect ratio of 6 or less, a tapping bulk density of 0.8 g/cm$^3$ or more and a lattice spacing (Co value) of 6.745 Å or less.

(8) An electroconductive curable resin composition as described in any one of the above items (1) to (7), wherein the component (B) comprises at least one resin selected from a phenolic resin, an unsaturated polyester resin, an epoxy resin, a vinyl ester resin and an allyl ester resin; and a curing agent.

(9) An electroconductive curable resin composition as described in the above item (8), wherein the component (B) comprises an epoxy resin and a phenolic resin.

(10) An electroconductive curable resin composition as described in the above item (9), wherein the epoxy resin comprises a cresol novolak-type epoxy resin and the phenolic resin comprises a novolak-type phenolic resin.

(11) An electroconductive curable resin composition as described in the above item (8), wherein the component (B) comprises a vinyl ester resin and/or an allyl ester resin; at least one monomer selected from allyl ester monomer, acrylic acid ester monomer, methacrylic acid ester monomer and styrene monomer; and a radical polymerization initiator.

(12) An electroconductive curable resin composition as described in the above item (11), wherein the vinyl ester resin is a novolak-type vinyl ester resin.

(13) An electroconductive curable resin composition as described in any one of the above items (1) to (12), wherein the component (A) is a graphite powder containing from 0.05 to 5.0 mass % of boron.

(14) An electroconductive cured product which is obtainable by curing an electroconductive curable resin composition as described in any one of the above items (1) to (13), which has a volume resistivity of $2 \times 10^{-2}$ Ωcm or less, a contact resistance of $2 \times 10^{-2}$ Ωcm$^2$ or less and a thermal conductivity of 1.0 W/m·K or more.

(15) A process for producing an electroconductive cured product as described in the above item (11), which comprises forming the cured product by any one of compression molding, transfer molding, injection molding and injection-compression molding.

(16) A separator for fuel cells, which is obtainable by curing an electroconductive curable resin composition as described in any one of the above items (1) to (13) which is an electroconductive curable resin composition comprising from 50 to 95 mass % of the component (A) (or, from 50 to 95 mass % of the sum of the component (A) and the component (C), if any), the separator having a volume resistivity of $2 \times 10^{-2}$ Ωcm or less, a contact resistance of $2 \times 10^{-2}$ Ωcm$^2$ or less, a thermal conductivity of 1.0 W/m·K or more and a gas permeability of $1 \times 10^{-6}$ cm$^2$/sec or less.

(17) A process for producing a separator for fuel cells, which comprises forming a separator for fuel cells by any one of compression molding, transfer molding, injection molding and injection-compression molding, the separator being obtainable by curing an electroconductive curable resin composition as described in any one of the above items (1) to (13) which is an electroconductive curable resin composition comprising from 50 to 95 mass % of the component (A) (or, from 50 to 95 mass % of the sum of the component (A) and the component (C), if any), and the separator having a volume resistivity of $2 \times 10^{-2}$ Ωcm or less, a contact resistance of $2 \times 10^{-2}$ Ωcm$^2$ or less, a thermal conductivity of 1.0 W/m·K or more and a gas permeability of $1 \times 10^{-6}$ cm$^2$/sec or less.

Figure 1:
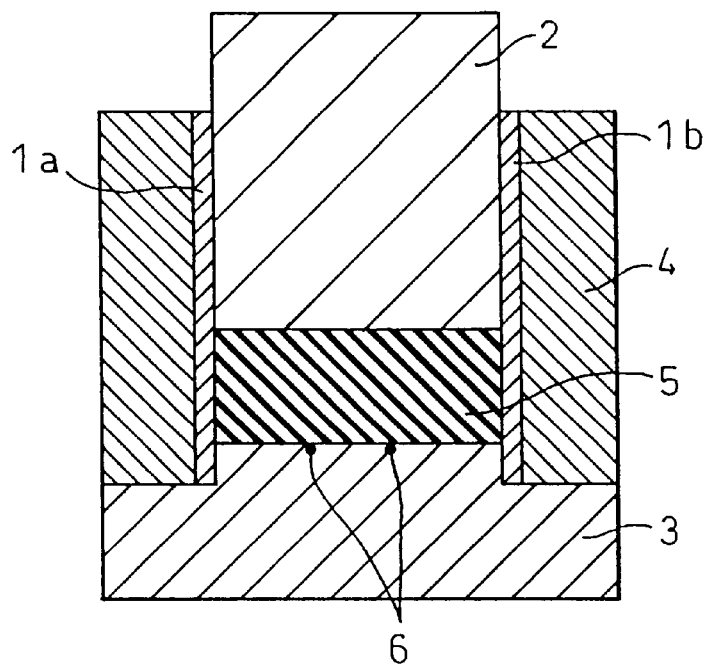
FIG. 1 is a schematic sectional view showing a method of measuring the electric resistivity of graphite powder to be used in the present invention.

In these figures, the Reference Numerals have the following meanings:

1*a*, 1*b*: electrode
2: compression rod
3: pedestal
4: side frame
5: sample
6: potential tap
11: specimen
12: carbon plate
13: copper plate
14: terminal

BEST MODE FOR CARRYING OUT THE INVENTION

Hereinbelow, the present invention will be described in detail with reference to the accompanying drawings as desired. In the following description, "%" and "part(s)" representing a quantitative proportion or ratio are those based on mass, unless otherwise noted specifically.

Resin Composition

The electroconductive curable resin composition according to the present invention comprises (A) a graphite powder containing boron in the graphite crystal, and (B) a curable resin and/or a curable resin composition.

Graphite Powder (A)

The graphite powder (A) for use in the present invention is characterized in that it contains boron in the graphite crystal thereof. If boron is not added to the material (s) for the graphite powder, the graphitization degree (i.e., crystallinity) is decreased at the time of the graphitization of the above material (s), and the lattice spacing (hereinafter referred to as a "Co value") is increased, whereby a graphite powder having a high electroconductivity cannot be obtained. The form or state of the boron contained in the graphite is not particularly limited, as long as boron and/or a boron compound is mixed in the graphite. However, in a preferred embodiment, boron atoms are present between layers of the graphite crystal, or a part of carbon atoms constituting the graphite crystal are substituted by boron atoms. In a case where a part of the carbon atoms are substituted by boron atoms, the bonding between the boron atom and the carbon atom may be in any bonding form such as covalent bond or ionic bond.

In the present invention, the specific surface area of the graphite powder (A) may preferably be 3 $m^2/g$ (according to a BET method according to ASTM D3037) or less. If the specific surface area exceeds 3 $m^2/g$, the resultant electroconductivity or formability may disadvantageously be deteriorated in some cases. The factors playing an important role in reducing the specific surface area of the graphite powder (A) include the particle size, the particle shape, the particle size distribution, the surface properties or conditions, and the like. Among these factors, the particle shape may preferably be approximated to a spherical form as closely as possible.

In addition, in order to further enhance the electroconductivity, it is important to increase the filling density of graphite particles. In this viewpoint, the graphite powder particles may preferably be not in the form of scales but may preferably be approximated to a spherical form as closely as possible. When the particle shape is expressed by the aspect ratio, the graphite powder for use in the present invention may preferably have an aspect ratio of 6 or less, more preferably 5 or less. In the forming of the electroconductive curable resin composition, compression molding, injection molding, transfer molding or injection-compression molding is applied to such forming. At this time, if the aspect ratio of the graphite powder as the component (A) exceeds 6, the fluidity tends to be deteriorated and formation failure may occur in some cases.

Aspect Ratio

The aspect ratio is generally expressed by the ratio of the major axis length to the minor axis length (major axis length/minor axis length) of a particle, and the value of the ratio can be determined from a microphotograph of the particle, etc. In the present invention, the aspect ratio is calculated as follows.

At first, an average particle size A calculated by the laser diffraction scattering method and an average particle size B calculated by the electric detection method (coulter counter method) are determined. From respective measurement principles, the value A can be regarded as the diameter of a sphere corresponding to the maximum length of the particle, and the value B can be regarded as the diameter of a sphere having the same volume as the particle. Assuming that the particle has a disk-like shape and the bottom face diameter is equal to the value A and the volume of the disk is C [$C=(4/3)\times(B/2)^3\pi$], respectively, the thickness of the disk can be calculated by an equation of $T=C/(A/2)^2\pi$. Accordingly, the aspect ratio can be obtained as the value of A/T (i.e., bottom face diameter/disk thickness).

With respect to the details of above laser diffraction scattering method, the following papers may be referred to:

AU Kazunori Tsutsui (Ohtsuka Denshi)
JN Y0903A (FTKOD) (0287–6280) Funtai To Kogyo
VN VOL. 32, NO. 6 PAGE, 25–33 2000;
ET Form analysis of particle (3),
  Particle size analysis (3.1).
  Outline of particle size measurement.
AU Hideo Yamamoto (Soka Univ.)
JN S0129A (FKKAD) (0386–6157) Funtai Kogaku Kaishi
VN VOL. 35, NO. 10 PAGE. 746–752 1998;
ET How to Determine and Measure Particle Size.
AU Jun-ichiro Tsubaki (Nagoya Univ.)
JN L0473A (0914–2703) Toryuu Kakogaku Kaishi
VN VOL. 43, NO. 7 PAGE. 302–305 1999; and
ET Special issue: Measurement of fine powder and application. What is observed through particle size measurement?
AU Hideo Yamamoto (Soka Univ.)
JN L0595A (NYSEE) (0916–4057) New Ceramics
VN VOL. 6, NO. 2 PAGE. 31–37 1993.

With respect to the details of the above coulter counter method, the following paper may be referred to:

ET Particle-size distribution measurement of particulate. Electrical detection method.
AU Hideo Yamamoto (Tokyo Univ.)
JN S0458A (0409–2473) Bessatu Kagaku Kogyo
VN VOL. 33, NO. 5 PAGE. 292–296 1989;
ET Inertial, sedimentation, image analysis and electro-zone measurements of particle size.
AU CLIFT R (Univ. Surrey, Surrey, GBR)
JN K19900011 (0-471-91997-7) Part Size Anal 1988
VN PAGE. 3–17 1987
CO Particle Size Analysis Conference (6th) Guildford;
ET Methods for measuring particle size distribution in powder and preparation technology. Electrical measuring methods.
AU Hideo Yamamoto (Tokyo Univ.)
JN F0134A (CMNGA) (0387–1037) Chemical Engineering
VN VOL. 34, NO. 7 PAGE. 524–528 1989;
ET Topics of versatile particulate technology. Evaluation of measuring device of particle size distribution. Effects of particle shape.
AU Jun-ichiro Tsubaki (Nagoya Univ.) et al.
JN F0134A (CMNGA) (0387–1037) Chemical Engineering
VN VOL. 42, NO. 9 PAGE. 673–677 1997

Tapping Bulk Density

The graphite powder for use in the present invention may preferably have a tapping bulk density of 0.8 $g/cm^3$ or more, more preferably 0.9 $g/cm^3$ or more. If the tapping bulk density is less than 0.8 $g/cm^3$, the loading property of the graphite powder can be deteriorated and the resultant electroconductivity or gas-permeability of a cured product can be decreased.

In the present invention, the tapping bulk density is calculated from the relationship between the volume and the mass which have been measured according to a method such that a predetermined amount of graphite powder (6.0 g) is weighed, and charged into a 15-mmφ (i.e., 15-mm diameter)

measuring cell, and the measuring cell is set to a tapping apparatus and the tapping apparatus is operated so as to provide free fall of 400 times under the conditions that the drop height is 45 mm and the tapping speed is 2 sec/fall.

With respect to the details of the tapping bulk density, a powder property measuring apparatus (trade name: Multi-Tester MT-1000 or 1001, mfd. by Seishin Kigyo) may be used, and the thus obtained data may be calculated by using the following Kawakita's formula:

$$\frac{N}{C} = \frac{1}{ab} + \frac{1}{a}N$$

$N$: Number of tappings $$C = \frac{V_O - V_T}{V_O}$$

$V_O$: initial volume $V_T$: volume after tappings of n-times $\frac{1}{b}$: value representing strength of adhesion $a$: value representing fluidity The tapping bulk density of the graphite powder has a relationship with the particle size, shape and surface properties or conditions of the powder, and the tapping bulk density may vary depending on the particle size distribution even when the average particle size is the same. Therefore, if many particles are in the form of scales or in the form of fine powder, the tapping bulk density cannot be increased. For example, if a graphite material is merely pulverized to an average particle size of approximately from 10 to 30 μm, a fine powder is contained in the resultant pulverized product in a large proportion, and it is extremely difficult to increase the tapping bulk density to 0.8 g/cm³ or more. In a preferred embodiment of the present invention, the fine powder content in the graphite powder can be reduced to as little as possible, and the graphite powder has a broad particle size distribution, and has a relatively high tapping bulk density, but has a relatively small aspect ratio as graphite powder as described above. In other words, the graphite powder in a preferred embodiment is in the form of scales or has a low degree of scale, and therefore, a cured product having a high filling density and a high electroconductivity can easily be obtained.

Crystallinity

The graphite powder as the component (A) for use in the present invention may preferably have a crystallinity as high as possible, and the above-mentioned Co value of the graphite structure where hexagonal network plane are stacked may preferably be 6.745 Å or less, more preferably 6.730 Å or less, still more preferably 6.720 Å or less. The electric resistivity of the resultant cured product can be reduced by enhancing the crystallinity of the graphite powder in this manner.

The graphite powder can contain boron, beryllium, aluminum, silicon or another graphitization catalyst. Among these, boron is effective, and when boron is added to carbon powder and graphitized, the degree of graphitization (crystallinity) is increased and the Co value is decreased. When boron is added to carbon for the purpose of obtaining graphite having the same crystallinity as that of graphite containing no boron, the temperature for the graphitization treatment can be lower compared with that in a case where no boron is added to carbon.

Powder Electric Resistivity

The graphite powder for use in the present invention may preferably have a powder electric resistivity as low as possible, in terms of the powder electric resistivity in the right angle direction with respect to the direction of applied pressure in a state where a pressure is applied to the graphite powder so as to provide a bulk density of 1.5 g/cm³. More specifically, the powder electric resistivity may preferably be 0.06 Ωcm or less, more preferably 0.01 Ωcm or less. If the electric resistivity of the graphite powder exceeds 0.06 Ωcm, the electroconductivity of the cured product which has been obtained by curing a composition comprising a curable resin in combination with the graphite powder is reduced, and it becomes difficult to obtain a desired cured product.

Figure 2:
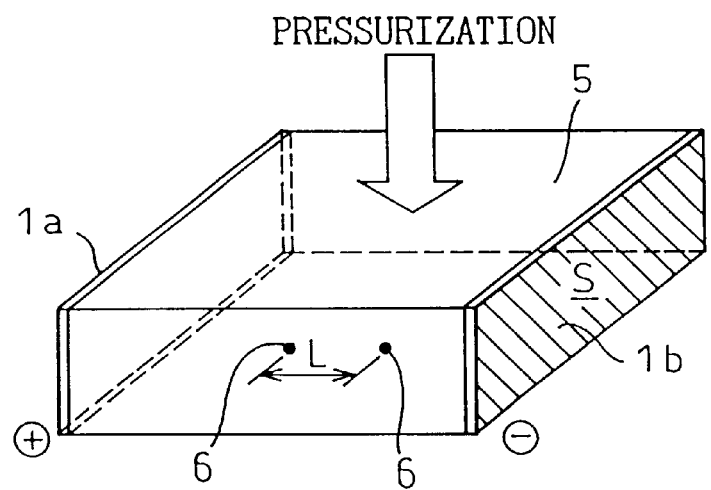
FIG. 2 is a schematic perspective view showing a method of measuring the electric resistivity of graphite powder to be used in the present invention.

FIG. 1 (sectional view) and FIG. 2 (shematic view) show a method of measuring the electric resistivity of the graphite powder. Referring to FIG. 1, this device for measuring the electric resistivity comprises a pair of electrodes 1a and 1b for applying a voltage to a sample 5 (graphite powder), a compression rod 2 for applying a pressure to the sample 5, a pedestal for supporting the sample 5, side frames 4 for containing the sample 5, and a pair of taps 6 disposed at the lower end of the sample 5 for measuring the potential provided in the sample 5. In FIG. 1, each of the electrodes 1a and 1b comprises a copper plate, and each of the compression rod 2, pedestal 3, and side frame 4 comprises a resin. The taps 6 are provided on a position corresponding to a central part of the sample 5 with respect to the direction perpendicular to the plane of this drawing.

The electric resistivity of a sample is measured by using the four-terminal method as shown in FIG. 1 in the following manner. The sample 5 of graphite powder is compressed by the compression rod 2, and an electric current (I) is passed from the electrode 1a to the electrode 1b. The voltage (V) between the taps 6 is measured by using the taps 6. At this time, the voltage to be used in the present invention is a value obtained when the sample 5 is compressed by the compression rod 2 so as to provide a bulk density of 1.5 g/cm³.

More specifically, when the electric resistance (between taps 6) of the sample 5 is represented by R (Ω), a relationship of R=V/I is established. From this relationship, the electric resistance R (Ω) is determined, and then the electric resistivity ρ can be determined according to an equation of ρ=R·S/L [ρ: electric resistivity, S: cross-sectional area (cm²) in the direction of the electric current (I) passing through the sample 5, namely, in the right angle direction with respect to the direction of the applied pressure so that the direction of the current and the direction of the applied pressure are perpendicular to each other, L: distance (cm) between the taps 6]. In the actual measurement, the cross section of the sample 5 in the right angle direction has a width of about 1 cm, a length (height) of about 0.5 cm to 1 cm, and the length of the sample 5 in the direction of the electric current passing through the sample 5 is 4 cm, and the distance (L) between the taps 6 is 1 cm (SDK method). In this measurement, 4–6 g of a sample (capable of changing depending on the bulk of the sample) is charged into a cell, and the sample is compressed until it provides a bulk density of 1.5 g/cm³. This bulk density is calculated by using the amount of the charged sample and the volume of the cell.

Enhancement of Electroconductivity

In order to enhance the electroconductivity of the cured product of the present invention, it is preferred to enhance the electroconductivity of the graphite powder. For such a purpose, it is preferred to enhance the electroconductivity of graphite per se, and accordingly, the crystallinity of the graphite may desirably be improved. For example, it may be effective to use graphite produced from a raw material capable of easy graphitization, or to raise the graphitization temperature. It may also be effective to increase the crystallinity of the graphite by using a graphitization catalyst such as boron. Further, it may also be effective to reduce the number of the contact points between the respective graphite particles, namely, to lower the content of graphite fine powder. In view of the electroconductivity, the graphite particle may preferably be large, but it is not desirable to use excessively large graphite particles because the surface of the resultant formed product becomes relatively rough. Therefore, the average particle size of the graphite powder may preferably be increased as much as possible within an extent wherein substantially no trouble is caused when the curable resin composition according to the present invention is formed and cured.

Particle Size

The particle size of the graphite powder for use in the present invention may preferably be from 5 to 80 μm, more preferably from 20 to 50 μm in terms of the average particle size. The particle size is measured by the laser diffraction scattering method. More specifically, 50 mg of a sample is weighed and added to 50 ml of distilled water, 0.2 ml of an aqueous 2% Triton (nonionic surfactant, polyoxyethylene (10) isooctylphenyl ether; trade name: Triton-100X available from Aldich, Wako, Tokyo Kasei, Junsei Kagaku, etc.) solution is added thereto, the resulting solution is dispersed by using an ultrasonic wave for 3 minutes and then the particle size is measured by means of a measuring apparatus (trade name: Microtrack HRA) mfd. by Nikkiso K.K.

Production of Graphite Powder

The graphite powder as the component (A) for use in the present invention can be produced as follows.

For obtaining graphite powder, generally, coke is first produced. As the starting material of the coke, petroleum-type pitch, coal-type pitch or the like may be used. This starting material is carbonized into coke. For obtaining graphite powder from the coke, there may be used a method of pulverizing and then graphitizing the coke, a method of graphitizing the coke per se and then pulverizing the graphitized coke, or a method of adding a binder to coke, forming and burning the resultant mixture to obtain a burned product (hereinafter, the coke and the burned product are collectively referred to as "coke and the like"), and graphitizing and then pulverizing the burned product into powder.

However, if the coke and the like are pulverized after the graphitization thereof, scaly powder is readily produced at the time of the pulverization because crystals are grown to a certain extent in the graphitized product. Accordingly, in order to obtain powder particles having a small aspect ratio and a shape closer to a spherical shape in the present invention, it is preferred to pulverize non-graphitized coke and the like, classify the resulting particles into a classified product having a predetermined particle size and a predetermined surface area, and then graphitize the classified product. It is preferred to use the starting material coke and the like wherein the growth of crystals are hindered as completely as possible, the starting material coke and the like may suitably be heat-treated at 2,000° C. or less, preferably 1,200° C. or less.

The aspect ratio after the pulverization varies depending on the kind of the starting material coke. It is known that the coke includes a needle-type coke which may readily be graphitized, and a non-needle type coke of which graphitizing property is poorer than the needle-type coke. According to the investigations of the present inventors, it has been found that when the coke is pulverized into powder, the non-needle type coke is suitable for obtaining powder particles having a small aspect ratio. Therefore, the starting material coke may preferably be non-needle type coke which has been subjected to a heat treatment at 2,000° C. or less, preferably 1,200° C. or less.

According to the investigations of the present inventors, it has also been found that when the powder of coke and the like is graphitized, not only the crystallization proceeds but also the surface area of a particle is reduced, whereby such a process is also advantageous in this viewpoint. For example, coke powder having an average particle size of 10 μm obtained by pulverizing coke has a surface area of about 14 $m^2/g$. However, when this coke powder is graphitized at 2,800° C. or more, the resultant surface area is reduced to 2 $m^2/g$ to 3 $m^2/g$. On the other hand, when the coke is graphitized and then pulverized, the surface area is at least 5 $m^2/g$ or more and sometimes 10 $m^2/g$ or more, though it may vary depending on the particle size. In comparison with this process, in the method of pulverizing and then graphitizing the coke, it may be presumed that carbon atoms are reoriented at the time of graphitization and a part of the surface of the pulverized particles is vaporized at a high temperature, whereby the surface of the pulverized particles is cleaned or smoothened, and therefore the surface area is reduced.

The coke and the like can be crushed or pulverized by using a high-speed rotary grinder (e.g., a hammer mill, a pin mill, a cage mill), various ball mills (e.g., roll mill, vibrating mill, planetary mill) or a stirring-type mill (e.g., beads mill, attritor, flow tube-type mill, annular mill). In addition, a fine grinder such as screen mill, turbo mill, super micron mill and jet mill may also be used by selecting the conditions to be used therefor. The coke and the like may be pulverized by using such a grinder by selecting the pulverization conditions and if desired, the pulverized powder may be classified so as to have an average particle size preferably in the range from 5 to 80 μm. More preferably, particles having a particle size of 3 μm or less and/or a particle size of above 80 μm may substantially be removed to reduce the contents of these particles so that the content of each of these particles becomes 5 mass % or less, more preferably 1 mass % or less.

The method for classifying the coke powder and the like is not particularly limited as long as the separation can be attained thereby. For example, sieving or an air classifier such as forced vortex-type centrifugal classifier (e.g., micron separator, Turboplex (trade name, mfd. by Hosokawa Micron K.K.), turbo classifier, super separator) and inertial classifier (e.g., improved-type virtual impactor, elbow jet) may be used. Further, a wet-type precipitation/separation method, a centrifugal classification method or the like may be used.

Graphite Containing Boron

Further, in order to obtain the graphite powder for use in the present invention, it is possible that B element, $H_3BO_3$, $B_2O_3$, $B_4C$, BN or the like is added as a boron source to the powder of coke and the like before the graphitization treatment, and after sufficient mixing, the coke and the like are graphitized. If the mixing of the boron element or compound is not uniform, the graphite powder not only tends to be non-uniform, but also tends to be sintered with a high probability at the time of graphitization thereof. For attaining uniform mixing, the boron source may preferably be formed into powder having a particle size of about 50 μm or less, preferably about 20 μm or less, before the mixing with the powder of coke and the like.

The content of boron in the component (A) according to the present invention may preferably be from 0.05 to 5.0 mass % based on the amount of graphite powder. If the boron content is less than 0.05 mass %, the desirable highly electroconductive graphite powder may not be obtained in some cases. Even if the boron content exceeds 5.0 mass %, the excessive portion of the boron have no effect to obtain a higher electroconductivity of the graphite powder.

The temperature at the time of graphitizing the powder of coke and the like containing the boron source may preferably be relatively high. However, due to the restriction by the apparatus and the like to be used for the graphitization, the graphitizing temperature may preferably be in the range from 2,500° C. to 3,200° C. The graphitization may be performed by a method of using an Acheson furnace where the powder is placed or enclosed in a graphite crucible and an electric current is directly passed therethrough, a method of heating the powder by means of a graphite heating element, or the like.

Vapor-phase Process Carbon Fiber

The vapor-phase process carbon fiber which is usable as the component (C) in the present invention may be obtained, e.g., by using a raw material of an organic compounds such as benzene, toluene, and natural gas; and by subjecting the raw material to a thermolysis reaction together with hydrogen gas at 800–1300° C. in the presence of a transition metal catalyst such as ferrocene. Further, it is preferred to subsequently graphitize the thus produced carbon fiber at about 2500–3200° C. It is more preferred to graphitize the carbon fiber at about 2500–3200° C. in the presence of a graphitizing catalyst such as boron, boron carbide, beryllium, aluminum, and silicon.

With respect to the details of the vapor-phase process carbon fiber, the following papers may be referred to:

ET An Experiment on the Process for Producing Vapor Growth Carbon Fiber by CVD. (Second report).
AU Noboru Fujimoto (Kyushu Univ.) et al.
JN F0872C Proceedings of Nihon-Den-netsu Symposium
VN VOL. 32nd, NO. Vol 2 PAGE. 557–558 1995;
ET Graphite whisker. Properties and applications.
AU Minoru Harada (Nikkiso)
JN Z0915A Program of Gosei-Jushi Kogyo Gijutsu Symposium
VN VOL. 38th PAGE. 58–62 1992;
ET Preparation and Properties of graphite in vapor phase.
AU Hideki Ueno et al.
JN G0398B Proceedings of Denki Zetsuen Zairyo Symposium
VN VOL. 23rd PAGE. 49–54 1990;
ET Graphite whisker prepared by vapor flow process.
AU Masahiko Hatano (Nikkiso)
JN F0107A (KAKTA) (0022–7684) Kagaku To Kogyo
VN VOL. 39, NO. 4 PAGE. 262–264 1986;
ET Preparation and properties of graphite by a plasma CVD method.
AU Jun Shiotani et al.
JN S0532B Denshi Joho Tsushin Gakkai Gijutsu Kenkyuu Report
VN VOL. 90, NO. 230 (OME90 27–34) PAGE. 33–38 1990;
ET Synthesis and characteristics of high-conductivity graphite by gaseous phase method.
AU Hideki Ueno et al.
JN F0314A (SUDEA) SEI Technical Review
VN NO. 137 PAGE. 218–222 1990.

In the present invention, it is preferred to use a vapor-phase process carbon fiber having a fiber diameter of 0.05–10 μm and a fiber length of 1–500 μm. The vapor-phase process carbon fiber may more preferably have a fiber diameter of 0.1–5 μm and a fiber length of 5–50 μm, further preferably a fiber diameter of 0.1–0.5 μm and a fiber length of 10–20 μm.

Carbon Nanotube

Further, with respect to the carbon nanotube which is usable as the component (C) in the present invention, in recent years, not only the mechanical strength thereof, but also the electric field-emitting function and a hydrogen-occluding function thereof have industrially attracted attention, and further, attention is directed to the magnetic functions thereof. This kind of carbon nanotube may also be referred to as graphite whisker, filamentous carbon, graphite fiber, extra-fine carbon tube, carbon tube, carbon fibril, carbon micro-tube, carbon nanofiber, etc. The carbon nanotubes include two types: a single-layer carbon nanotube wherein the graphite film constituting the tube is in the form of a single layer, and a multi-layer carbon nanotube wherein the graphite film constituting the tube is in the form of a multi-layer. In the present invention, both of these types can be used. However, when the single-layer carbon nanotube is used, a cured product having a higher electroconductivity and a higher mechanical strength may preferably be provided.

The carbon nanotube may be produced, e.g., as described in "Basics of Carbon Nanotubes", P23–P57 (1998), Corona Publishing Co., by an arc discharge method, a laser evaporation method and a thermolysis method, and the purity thereof may further be enhanced a hydrothermal method, a centrifugal separation method, an ultrafiltration method, an oxidation method, etc. More preferably, the carbon nanotube may be subjected to a high temperature treatment at about 2500–3200° C. in an atmosphere of inert gas so as to remove any impurity contained therein. More preferably, the carbon nanotube may be subjected to a high temperature treatment at about 2500–3200° C. in an atmosphere of inert gas in the presence of a graphitizing catalyst such as boron, boron carbide, beryllium, aluminum, and silicon.

In the present invention, it is preferred to use a carbon nanotube having a fiber diameter of 0.5–100 nm and a fiber length of 0.01–10 μm. The carbon nanotube may more preferably have a fiber diameter of 1–10 nm and a fiber length of 0.05–5 μm, and further preferably a fiber diameter of 1–5 nm and a fiber length of 0.1–3 μm.

In the present invention, the fiber diameter and fiber length of the vapor-phase process carbon fiber and carbon nanotube can be measured by means of an electron microscope. More specifically, the diameters and lengths of 100 fibers are randomly measured by using an election micrograph thereof, and these data are averaged.

The electroconductivity and mechanical strength of a cured product according to the present invention may be enhanced by incorporating the vapor-phase process carbon fiber and/or carbon nanotube in combination with the component of (A) according to the present invention, preferably in an amount of at most 40 mass %. The amount of the vapor-phase process carbon fiber and/or carbon nanotube may more preferably be 30 mass % or less, particularly 20 mass % or less. When the addition amount of the vapor-phase process carbon fiber and/or carbon nanotube exceeds 40 mass %, the resultant shaping property may be undesirably lowered.

In the present invention, the mass ratio of the component (A) (i.e., graphite powder containing boron in the graphite crystal) to the component (C) may preferably be 60 to 99.9:40 to 0.1, more preferably 70 to 99:30 to 1, particularly preferably 80 to 95:20 to 5, wherein the component (C) is vapor-phase process carbon fiber having a fiber diameter of 0.05–10 $\mu$m and a fiber length of 1–500 $\mu$m, and/or carbon nanotube having a fiber diameter of 0.5–100 nm and a fiber length of 0.1–10 $\mu$m.

The electroconductive curable resin composition according to the present invention may further be enhanced when the composition includes the component(C).

Curable Resin

Examples of the curable resin as the component (B) for use in the present invention include: a phenolic resin, an unsaturated polyester resin, an epoxy resin, a vinyl ester resin, an alkyd resin, an acrylic resin, a melamine resin, a xylene resin, a guanamine resin, a diallyl phthalate resin, an allyl ester resin, a furan resin, an imido resin, a urethane resin, a urea resin, etc.

Among these, at least one curable resin selected from a phenolic resin, an unsaturated polyester resin, an epoxy resin, a vinyl ester resin and an allyl ester resin may preferably be used.

Specific examples of the phenolic resin for use in the present invention include a resol-type phenolic resin and a novolak-type phenolic resin.

Specific examples of the unsaturated polyester resin for use in the present invention include, according to the dibasic acid of the starting material therefor: ortho-phthalic acid type, isophthalic acid type, terephthalic acid type, adipic acid type, HET acid type (HET acid: hexachloro-3,6-endomethylene-Δ4-tetrahydrophthalic anhydride), 3,6-endomethylene-Δ4-tetrahydrophthalic anhydride type, maleic acid type, fumaric acid type, itaconic acid type, etc.

Specific examples of the epoxy resin for use in the present invention include: bisphenol A-type epoxy resin, brominated bisphenol A-type epoxy resin, phenol novolak-type epoxy resin, cresol novolak-type epoxy resin, alicyclic epoxy resin, aliphatic epoxy resin, etc.

Specific examples of the vinyl ester resin for use in the present invention include novolak-type vinyl ester resin and bisphenol-type vinyl ester resin.

Specific examples of the allyl ester resin for use in the present invention include: those produced from an ester of polyhydric carboxylic acid (such as terephthalic acid, isophthalic acid, trimellitic acid and pyromellitic acid), a polyhydric alcohol (such as ethylene glycol, propylene glycol, 1,4-butanediol and neopentyl glycol), and an allyl alcohol.

The above-mentioned curable resins can be used individually or in a combination of two or more kinds thereof. The amount thereof may be from 20 to 99.9: from 80 to 0.1 in terms of the mass ratio of the sum of the component (A) and the component (C), to the curable resin and/or curable resin composition (B), i.e., in terms of the mass ratio of (A+C:B). Herein, the sum of the mass ratios is 100, and when the component (C) is not contained, this ratio becomes the mass ratio of A:B. If the addition amount of the component (B) exceeds 80 mass % and the addition amount of the graphite powder is less than 20 mass %, the electroconductivity of the cured product may be reduced.

In the field where gas-tightness is required, a resin which does not generate a gas at the curing reaction may preferably be selected, such as a combination of an epoxy resin and a phenol resin, an unsaturated polyester resin, a vinyl ester resin, an allyl ester resin, etc. By using such a resin, a formed product having substantially no voids in the cured product and having a high gas-tightness can be obtained.

In the field where heat resistance, acid resistance or the like is required, a resin having a molecular skeleton such as bisphenol A type, novolak type or cresol novolak type is preferred. For example, in the case of a combination of an epoxy resin and a phenol resin, those where the epoxy resin comprises a cresol novolak-type epoxy resin and the phenol resin comprises a novolak-type phenol resin are preferred because heat resistance, chemicals resistance and gas-tightness can be improved. Further, those where the vinyl ester resin comprises a novolak-type vinyl ester resin are preferred because heat resistance, chemicals resistance, gas-tightness and formability or workability can be improved.

Monomer

In the present invention, to the above-described curable resin, a monomer such as allyl ester monomer, acrylic acid ester monomer, methacrylic acid ester monomer and styrene monomer can be added as a component of the curable resin composition in the component (B).

Specific examples of the allyl ester monomer for use in the present invention include: aromatic diallyl carboxylates such as diallyl phthalate, diallyl isophthalate, dimethallyl isophthalate, diallyl terephthalate, diallyl 2,6-naphthalenedicarboxylate, diallyl 1,5-naphthalenedicarboxylate, allyl 1,4-xylenedicarboxylate and diallyl 4,4'-diphenyldicarboxylate; and diallyl cyclohexanedicarboxylate.

Specific examples of the acrylic acid ester monomer and the methacrylic acid ester monomer include: phenoxyethyl methacrylate, isononyl methacrylate, benzyl methacrylate, dicyclopentenyloxyethyl (meth)acrylate, pentaerythritol tetra(meth)acrylate, glycerin di(meth)acrylate and 1,6-hexanediol diacrylate. Further, for the purpose of imparting the flame resistance, a halogen-substituted compound of the above monomer may also be used.

Examples of the styrene monomer include: styrene, α-methylstyrene, chlorostyrene, styrenesulfonic acid, 4-hydroxystyrene, vinyltoluene and divinylbenzene. Among these, styrene is preferred.

Curing Agent

The curing agent for use in the present invention may preferably be a radical polymerization initiator, and the radical polymerization initiator may include organic peroxides and photopolymerization initiators, etc. In the present invention, the organic peroxide is preferred. Specific examples of the organic peroxide usable in the present invention include: known peroxides such as dialkyl peroxide, acyl peroxide, hydroperoxide, ketone peroxide and peroxyester. Specific examples thereof include: benzoyl peroxide, tert-butyl peroxy-2-ethylhexanate, 2,5-dimethyl 2,5-di(2-ethylhexanoylyl)peroxyhexane, tert-butyl peroxybenzoate, tert-butyl hydroperoxide, cumene hydroperoxide, dicumyl peroxide, di-tert-butyl peroxide and 2,5-dimethyl-2,5-dibutyl peroxyhexane.

Photopolymerization Initiator

Specific examples of the photopolymerization initiator include: 2,2-dimethoxy-1,2-diphenylethan-1-one, 1-hydroxycyclohexylphenyl ketone, benzophenone, 2-methyl-1-(4-methylthiophenyl)-2-morpholinopropane-1, 2-benzyl-2-dimethylamino-1-(4-morpholinophenyl)-butanone-1,2-hydroxy-2-methyl-1-phenylpropan-1-one and 2,4,6-trimethylbenzoyldiphenylphosphine oxide. These radical polymerization initiators may be used individually or in combination of two or more thereof.

Additive

For the purpose of improving hardness, strength, electroconductivity, formability, durability, weatherability, water resistance and the like, the electroconductive curable resin composition of the present invention may further contain an additive such as glass fiber, carbon fiber (other than vapor-phase process carbon fiber; such as PAN-type, pitch-type), ultraviolet stabilizer, antioxidant, antifoaming agent, leveling agent, mold-releasing agent, lubricant, water repellent, thickener, low shrinking agent hydrophilicity-imparting agent, etc.

Production of Resin Composition

To obtain the electroconductive curable resin composition of the present invention, the above-described components may preferably be mixed uniformly while keeping a constant temperature so as not to initiate the curing, by using a mixer or kneader commonly used in the field of resin technique, such as roll, extruder, kneader, Banbury mixer, Henschel mixer or planetary mixer. In case of adding a radical polymerization initiator, the radical polymerization initiator may preferably be added and mixed at the final stage, after all of the other components are uniformly mixed.

Forming Method

The electroconductive curable resin composition according to the present invention may be formed (or shaped) into the shape of powder, granule, pellet, tablet, sheet or the like, and then subjected to the final forming step.

The method for forming the electroconductive curable resin composition of the present invention is not particularly limited. However, the composition may be formed into a desired shape by using a generally known forming method such as compression molding, transfer molding, injection molding and injection-compression molding, and cured by heating. In the case of a resin having an unsaturated bond, the resin may be cured by the irradiation of high-energy rays accompanied with the generation of radicals. With respect to the heat-curing conditions, it is important to select and find an optimum temperature according to the kind of the composition. The conditions may be appropriately determined, for example, in the temperature range of from 120 to 200° C. and in the heating period of time of from 30 to 1,200 seconds. After the composition is formed under heat, after-curing treatment may be applied to the product at a temperature of 150 to 200° C. for 10 to 600 minutes, whereby complete curing can be achieved.

The electroconductive curable resin composition of the present invention may easily be free of an organic solvent and such an embodiment is favored with good workability and operability. This point is extremely valuable in consideration of the recent tendency of taking seriously the safety of workers and conservation of the global environment. Of course, in order to further enhance the formability or workability of the electroconductive curable resin composition of the present invention, a solvent may be added so as to further improve the fluidity.

Physical Properties

The electroconductive cured product according to the present invention may preferably have the following properties. More specifically, the volume resistivity may preferably be $2\times10^{-2}$ Ωcm or less, more preferably $8\times10^{-3}$ Ωcm or less. Particularly, in a case where the cured product is used in a separator for fuel cells, the volume resistivity may preferably be $5\times10^{-3}$ Ωcm or less. The contact resistance may preferably be $2\times10^{-2}$ Ωcm$^2$ or less, more preferably $1\times10^{-2}$ Ωcm$^2$ or less, particularly preferably $7\times10^{-3}$ Ωcm$^2$ or less.

The thermal conductivity of the cured product may preferably be 1.0 W/m·K or more, more preferably 4.0 W/m·K or more, still more preferably 10 W/m·K or more. The gas permeability which is an important characteristic value as a separator for fuel cells, may preferably be $1\times10^{-6}$ cm$^2$/sec or less, more preferably $1\times10^{-8}$ cm$^2$/sec or less, particularly preferably $1\times10^{-9}$ cm$^2$/sec or less.

The cured product of the electroconductive curable resin composition of the present invention is an extremely high-performance composite material which can reproduce the electroconductivity or thermal conductivity of the graphite without particular limitation and can exhibit excellent properties in the heat resistance, corrosion resistance, forming precision and the like. Accordingly, the cured product is valuable in uses such as various parts in the field of electronics, electric parts, machine parts and vehicle parts. The cured product may particularly preferable be used as a separator material for fuel cells in one preferred embodiment.

EXAMPLES

Hereinbelow, the present invention will be described in further detail by referring to the Examples. However, the present invention is by no means limited to these Examples.

The materials used in the Examples are as described below.

Component (A) (Graphite Powder)

A1 to A-4

LPC-S Coke (hereinafter, referred to as "coke A") produced by Shin Nittetsu Kagaku K.K., which is a non-needle type coke (calcined product), was coarsely pulverized into a size of 2 to 3 mm or less by a pulverizer [mfd. by Hosokawa Micron K.K.]. The coarsely pulverized product was finely pulverized by a jet mill (IDS2UR, mfd. by Nippon Neumatic K.K.). Thereafter, the thus obtained powder was classified so as to adjust the particle size thereof to a desired value. The particles of 5 µm or less were removed by air classification by using a turbo classifier (TC15N, mfd. by Nisshin Engineering K.K.).

To a portion (14.4 kg) of the finely pulverized product, 0.6 kg of boron carbide ($B_4C$) was added and then mixed therewith by a Henschel mixer at 500 rpm for 5 minutes. The resulting mixture was enclosed in a graphite crucible with a cover having an inside diameter of 40 cm and a capacity of 40 liters. The crucible was sealed and placed in a graphitization furnace using a graphite heater and the powder was graphitized at a temperature of 2,900° C. The resultant product was allowed to cool and the resultant powder was taken out from the crucible to thereby obtain 14 kg of graphite powder.

A-5

Coke A was coarsely pulverized by a pulverizer into a size of 2 to 3 mm and this coarsely pulverized product was finely pulverized by a jet mill. Thereafter, the powder obtained was adjusted by classification to the desired particle size. The particles of 5 µm or less were removed by air classification by using a turbo classifier. Then, the powder was enclosed in a graphite crucible with a cover having an inside diameter of 40 cm and a capacity of 40 liters. The crucible was sealed and placed in a graphitization furnace using a graphite heater and the powder was graphitized at a temperature of 2,900° C. After being allowed to cool, the powder was taken out to obtain 14 kg of graphite powder.

A-6, A-8, A-9

Coke A was put, as it was, into a similar graphite furnace and graphitized at a temperature of 2,800° C. After being allowed to cool, the powder was taken out from the crucible, and a part (15 kg) of the thus obtained powder was coarsely pulverized by a pulverizer to a size of 2 to 3 mm. This coarsely pulverized product was finely pulverized by a jet mill. Thereafter, the thus obtained graphite powder was adjusted by classification to the desired particle size.

A-7

LPC-UL produced by Shin Nittetsu Kagaku K.K., which is a needle type coke (calcined product), was put as it is in a similar graphite furnace and graphitized at a temperature of 2,800° C. After allowing to cool, the powder was taken out and a part (15 kg) of the powder was coarsely pulverized to a size of 2 to 3 mm by a pulverizer. This coarsely pulverized product was finely pulverized by a jet mill and thereafter adjusted by classification to the desired particle size. The particles of 5 µm or less were removed by air classification using a turbo classifier.

The physical properties of A-1 to A-9 as the component (A) are shown in Table 1.

Component (B) (Curable Resin and/or Curable Resin Composition

Curable resin compositions were prepared by mixing the materials shown in Table 2 into a composition shown in Table 3, and curable resins shown in Table 2 were designated as B-1 to B-8 of component (B).

Component (C)

C-1: VGCF-G: Vapor-phase Process Carbon Fiber Mfd. by Showa Denko K.K. (Fiber Diameter 0.1–0.3 µm, Fiber Length 10–50 µm)

C-2: CNT: Carbon Nanotube

A hole having a diameter of 3 mm, and a depth of 30 mm was bored in a graphite rod having a diameter of 6 mm and a length of 50 mm from the tip thereof along the center axis, and the hole was packed with a mixture powder of rhodium (Rh):platinum (Pt):graphite (C)=1:1:1 (mass ratio), to thereby form an anode. On the other hand, there was formed a cathode having a diameter of 13 mm and a length of 30 mm which comprised graphite having a purity of 99.98%.

These electrodes were disposed in a reaction container so that they were disposed opposite to each other, and the electrodes were connected to a direct current power supply. The inside of the reaction container was replaced with helium gas having a purity of 99.9%, and direct current arc discharge was conducted. Thereafter, the soot which had been attached to the inner wall of the reaction container (chamber soot), and the soot which had been accumulated on the cathode (cathode soot) were collected. The pressure in the reaction container and the electric current were 600 Torr and 70A, respectively. During the reaction, the anode and the cathode were operated so that the gap between the anode and the cathode was always 1–2 mm.

The thus collected soot was charged into a mixed solvent comprising water and ethanol (mixing ratio=1:1), and then was dispersed therein by using ultrasound (device mfd. by Blanson Co., 130 W, dispersing time 30 min., normal temperature), and the resultant dispersion was collected and the solvent was removed by using a rotary evaporator. The thus obtained sample was dispersed in a 0.1%-aqueous solution of benzalkonium chloride as a cationic surfactant by using ultrasound, and then was subjected to centrifugal separation at 5000 rpm for 30 min., and the resultant dispersion was collected. Further, the dispersion was purified by heat-treating the dispersion in air at 350° C. for five hours, to thereby obtain carbon nanotubes having a fiber diameter of 1–10 nm and a fiber length of 0.05–5 µm.

The methods for measuring the physical properties of the cured product are described below.

The gas permeability was measured by using nitrogen gas at 23° C. in accordance with JIS K 7126 (Method A).

The volume resistivity was measured by the four-probe method in accordance with JIS K 7194.

The compressive strength was measured by using a specimen (20 mm×20 mm×2 mm) at a compressing rate of 1 mm/min in accordance with JIS K 7181.

The flexural strength and the flexural modulus were measured by using a specimen (80 mm×10 mm×4 mm) at span intervals of 64 mm and at a bending rate of 2 mm/min by the three-point system flexural strength measuring method in accordance with JIS K 6911.

The specific gravity was measured in accordance with JIS K 7112 (Method A; underwater substitution method).

The thermal conductivity was measured by using a specimen (diameter φ: 10 mm, thickness: 1.7 mm) at a temperature of 80° C. in vacuum by irradiating a ruby laser beam (excitation voltage: 2.5 kV) according to the laser-flash method ($t_{1/2}$ method, thermal constant measuring apparatus for laser-flash method: LF/TCM FA8510B mfd. by Rigaku Denki Co.).

Figure 3:
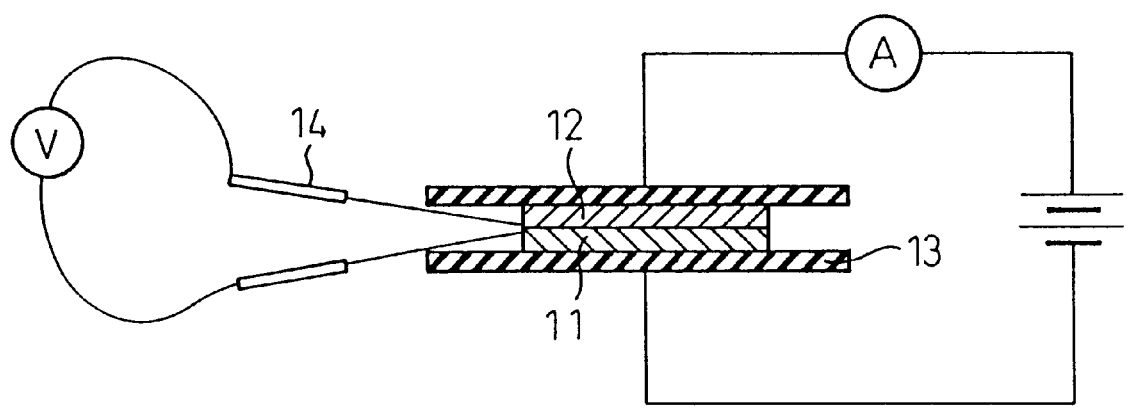
FIG. 3 is a schematic sectional view showing a method of measuring the contact resistance of a cured product to be used in the present invention.

The contact resistance value was determined as follows. A specimen 11 (20 mm×20 mm×2 mm) and a carbon plate 12 ($1.5 \times 10^{-3}$ Ωcm, 20 mm×20 mm×1 mm) were contacted in an apparatus as shown in FIG. 3 and then the specimen 11 and carbon plate 12 were sandwiched between copper plates 13, and a load of 98N was applied thereon. A constant current of 1 A was passed in the through direction and terminals 14 were contacted to the interface between the specimen 11 and the carbon plate 12 to measure the voltage. From the voltage measured, the resistance value was calculated. The value obtained was integrated with the contacting cross-sectional area and the resulting value was designated as the contact resistance value.

The heat resistance was measured and compared by the three-stage evaluation such that a bent specimen was left standing at a temperature of 140° C. in a Perfect oven (trade name, mfd. by Tabai-Espec K.K.) for 2,000 hours in an air atmosphere and thereafter whether the rate of change in the flexural strength is 20% or less, from 20 to 50%, or 50% or more (three-stage evaluation) was determined.

The acid resistance was measured and compared by the three-stage evaluation such that a specimen was dipped in an aqueous 5% sulfuric acid solution kept at a temperature of 90° C. for 100 hours and thereafter, whether the rate of change in the flexural strength was 20% or less, from 20 to 50%, or 50% or more was determined.

The spiral flow was determined by forming a sample under a pressure of 10 MPa by using a transfer molding machine 50t and measuring the spiral flow length (temp: 160° C., curing time: 3 min.).

In Examples 1 to 8, 10–13, 17, and 19–20 and Comparative Examples 1 to 7, 9 to 12 and 16 to 18, the resin composition was obtained by blending the components while kneading the components at a temperature of 40° C. for 30 minutes by using a universal mixing stirrer having a mechanism such that the stirring blade autorotates and revolves. The resin compositions obtained were revealed to have excellent storage stability without undergoing any change in the properties, even after the storage at 23° C. for 3 months (humidity: 50%, storage in dark place). Incidentally, as a polymerization inhibitor, hydroquinone was added in an amount of 0.05 parts by mass based on the total amount of the resin composition.

Each of the resin compositions obtained was cured by heating the composition at 140° C. for 5 minutes under applied pressure (200 kg/cm$^2$) by using a compression molding machine to form a cured product of 100 mm (thickness)×100 mm×2 mm. In Example 14 where dicumyl peroxide was used as the polymerization initiator, the cured product was obtained by curing the composition while heating at 180° C. for 4 minutes under applied pressure.

In Examples 9, 14 to 16 and 17 and Comparative Examples 8 and 13 to 15, the resin composition was obtained by kneading the components at a temperature of 80° C. for 15 minutes by using a kneader. The resin compositions obtained each was cured by heating the composition at 180° C. for 5 minutes under applied pressure (200 kg/cm$^2$) by using a compression molding machine to obtain a cured product.

The composition ratio (mass ratio) in each of the above-described Examples and Comparative Examples is shown in Tables 4, 6 and 8 and the results in the measurement of physical properties are shown in Tables 5, 7 and 9. Further, the results of the spiral flow performed in Examples 2 and 17 to 20 and Comparative Examples 16 to 18 are shown in Table 10.

TABLE 1

|     | Average Particle Size (μm) | Specific Surface Area (m$^2$/g) | Aspect Ratio | Bulk Density g/cm$^3$ | Lattice Spacing (Co value) (Å) | B Content (mass %) | Electric Resistivity (Ω cm) |
|-----|------|-------|-----|------|-------|------|--------|
| A-1 | 20.5 | 1.99  | 3.9 | 0.97 | 6.716 | 1.30 | 0.0031 |
| A-2 | 21.4 | 2.03  | 4.5 | 1.02 | 6.717 | 2.12 | 0.0034 |
| A-3 | 8.5  | 3.12  | 5.9 | 0.8  | 6.720 | 1.09 | 0.0031 |
| A-4 | 29.0 | 2.82  | 4.1 | 0.81 | 6.715 | 0.97 | 0.0030 |
| A-5 | 20.5 | 2.31  | 4.1 | 0.85 | 6.743 | 0    | 0.0510 |
| A-6 | 7.8  | 13.1  | 7.8 | 0.65 | 6.734 | 0    | 0.0890 |
| A-7 | 31.1 | 2.92  | 10  | 1.0  | 6.753 | 0    | 0.1090 |
| A-8 | 4    | 18.6  | 5.8 | 0.41 | 6.732 | 0    | 0.0917 |
| A-9 | 100  | 1.63  | 6.7 | 0.98 | 6.724 | 0    | 0.0083 |

In the above Table 1, each of the B contents shows a data thereof remaining in the graphite powder after graphitization.

This B contents were analyzed by means of an ICP-MS (inductively coupled plasma-mass spectrometry) apparatus (trade name: SPQ 9000, mfd. by Seiko-Denshi K.K.). With respect to the details of such a measurement, BROEKAETR J A C, PILGER C, POLLAMANN D, et al.;

J. Anal. Chem. VOL. 349, NO. 1/3, p. 20–25, 1994;

title: The use of plasma atomic spectrometric methods for the analysis of ceramic powders may be referred to.

In the measurement of the B content, in the present invention, X-ray diffraction, fluorescent X-ray analysis, ICP-MS analysis, thermolysis analysis may be used, as described in the following papers;

ET Nitrogen incorporation into boron-doped graphite and formation of B—N bonding.

AU KONNO H, NAKAHASHI T, INAGAKI M (Hokkaido Univ., Sapporo, JPN); SOGABE T (Toyo Tanso Co, Ltd., Ohnohara-cho, JPN)

JN H0270B (CRBNA) (0008–6223) Carbon

VN VOL. 37, NO. 3 PAGE. 471–475 1999; and

ET The effect of substitutional boron on irradiation damage in graphite.

AU BROCKLEHURST J E, KELLY B T, GILCHRIST K E (United Kingdom Atomic Energy Authority)

JN A0085A (CPHCA) Chem Phys Carbon

VN VOL. 17 PAGE. 175–231 1981

TABLE 2

| Curable Resin | cresol novolak-type epoxy resin | EOCN-104, produced by Nippon Kayaku Co., Ltd., epoxy equivalent: 205 to 230, softening point: 85 to 95° C. |
| --- | --- | --- |
| | phenolic resin | BRL-274, produced by Showa Highpolymer Co., Ltd., viscosity: 32,000 cps (25° C.) |
| | unsaturated polyester | M-407, produced by Showa Highpolymer Co., Ltd., viscosity: 13 cps (25° C.) |
| | novolak-type vinyl ester resin 1 | H-600, produced by Showa Highpolymer Co., Ltd., viscosity: 8 cps (25° C.) |
| | novolak-type vinyl ester resin 2 | SP-4010, produced by Showa Highpolymer Co., Ltd., viscosity: 180 cps (25° C.) |
| | allyl ester resin | AA101, produced by Showa Denko K.K., viscosity: 630,000 cps (30° C.) |
| Organic Peroxide | dicumyl peroxide | PERCUMYL D, produced by NOF Corporation |
| | t-butyl peroxide benzoate | PERBUTYL Z, produced by NOF Corporation |

TABLE 3

|  | B-1 | B-2 | B-3 | B-4 | B-5 | B-6 | B-7 | B-8 |
|---|---|---|---|---|---|---|---|---|
| Cresol novolak-type epoxy resin | 70 | | | | | | | |
| Phenolic resin | 30 | | | | | | | 100 |
| Unsaturated polyester | | 100 | | | | | | |
| Novolak-type vinyl ester resin 1 | | | 100 | | | | | |
| Novolak-type vinyl ester resin 2 | | | | 77 | 77 | | 50 | |
| Allyl ester resin | | | | | | 100 | 27 | |
| Trimethylolpropanetrisoxyethylene methacrylate | | | | 23 | 23 | | 23 | |
| dicumyl peroxide | | | | | | 1.5 | 1.5 | 1.5 |
| t-Butyl peroxybenzoate | | 1.5 | 1.5 | 1.5 | | | | |

TABLE 4

|  | Example |  |  |  |  |  |  |  | | Comparative Example |  |  |  |  |  |  |
|---|---|---|---|---|---|---|---|---|---|---|---|---|---|---|---|---|
|  | 1 | 2 | 3 | 4 | 5 | 6 | 7 | 8 | | 1 | 2 | 3 | 4 | 5 | 6 | 7 |
| B-4 | 50 | 30 | 20 | 20 | 20 | 20 | 20 | 20 | B-4 | 85 | 30 | 20 | 20 | 20 | 20 | 20 |
| A-1 | 50 | 70 | 80 | | | | 72 | 72 | A-1 | 15 | | | | | | |
| A-2 | | | | 80 | | | | | A-2 | | | | | | | |
| A-3 | | | | | 80 | | | | A-3 | | | | | | | |
| A-4 | | | | | | 80 | | | A-4 | | | | | | | |
| A-5 | | | | | | | | | A-5 | | 70 | 80 | | | | |
| A-6 | | | | | | | | | A-6 | | | | 80 | | | |
| A-7 | | | | | | | | | A-7 | | | | | 80 | | |
| A-8 | | | | | | | | | A-8 | | | | | | 80 | |
| A-9 | | | | | | | | | A-9 | | | | | | | 80 |
| C-1 | | | | | | | 8 | | C-1 | | | | | | | |
| C-2 | | | | | | | | 8 | C-2 | | | | | | | |

TABLE 5

|  | Example | | | | | | | |
|---|---|---|---|---|---|---|---|---|
|  | 1 | 2 | 3 | 4 | 5 | 6 | 7 | 8 |
| Specific gravity | 1.595 | 1.884 | 1.947 | 1.95 | 1.945 | 1.946 | 1.944 | 1.950 |
| Volume resistivity ($\Omega$ cm) | 0.08 | 0.004 | 0.0015 | 0.002 | 0.003 | 0.0012 | 0.0012 | 0.0011 |
| Contact resistance ($\Omega$ cm$^2$) | 0.7 | 0.009 | 0.003 | 0.003 | 0.004 | 0.002 | 0.0015 | 0.0015 |
| Thermal conductivity (W/mk) | 3.26 | 11.8 | 17.8 | 15.4 | 16.6 | 16.8 | 19.3 | 20.1 |
| Compression strength (MPa) | 51 | 62 | 72 | 68 | 73 | 57 | 98 | 102 |
| Flexural strength (MPa) | 26 | 34 | 38 | 36 | 38 | 30 | 46 | 48 |
| Flexural elasticity (MPa) | 8000 | 9600 | 11500 | 12000 | 12500 | 11000 | 18500 | 19000 |
| Gas permeability (cm$^2$/sec) | $4.0 \times 10^{-9}$ | $7.2 \times 10^{-9}$ | $5.0 \times 10^{-8}$ | $4.4 \times 10^{-8}$ | $7.8 \times 10^{-7}$ | $6.5 \times 10^{-8}$ | $5.6 \times 10^{-8}$ | $2.1 \times 10^{-8}$ |

TABLE 5-continued

|  | Comparative Example | | | | | | |
|---|---|---|---|---|---|---|---|
|  | 1 | 2 | 3 | 4 | 5 | 6 | 7 |
| Specific gravity | 1.321 | 1.875 | 1.953 | 1.949 | 1.946 | 1.945 | 1.951 |
| Volume resistivity ($\Omega$ cm) | 2 | 0.009 | 0.006 | 0.01 | 0.009 | 0.02 | 0.004 |
| Contact resistance ($\Omega$ cm$^2$) | 1.9 | 0.03 | 0.02 | 0.08 | 0.02 | 0.09 | 0.01 |
| Thermal conductivity (W/mk) | 0.52 | 12.9 | 16 | 14.5 | 17.5 | 14.7 | 19.4 |
| Compression strength (MPa) | 48 | 69 | 71 | 74 | 66 | 81 | 59 |
| Flexural strength (MPa) | 24 | 35 | 36 | 40 | 35 | 45 | 28 |
| Flexural elasticity (MPa) | 6000 | 9800 | 10500 | 12000 | 12400 | 13500 | 10100 |
| (cm$^2$/sec) | $5.2 \times 10^{-8}$ | $7.4 \times 10^{-9}$ | $5.4 \times 10^{-8}$ | $1.7 \times 10^{-7}$ | $6.3 \times 10^{-8}$ | $8.4 \times 10^{-6}$ | $5.0 \times 10^{-7}$ |

TABLE 6

|  | Example 9 | Comparative Example 8 | Example 10 | Comparative Example 9 | Example 11 | Comparative Example 10 | Example 12 | Comparative Example 11 |
|---|---|---|---|---|---|---|---|---|
| B-1 | 25 | 25 | | | | | | |
| B-2 | | | 25 | 25 | | | | |
| B-3 | | | | | 25 | 25 | | |
| B-4 | | | | | | | 25 | 25 |
| B-5 | | | | | | | | |
| B-6 | | | | | | | | |
| B-7 | | | | | | | | |
| B-8 | | | | | | | | |
| A-1 | 75 | | 75 | | 75 | | 75 | |
| A-7 | | 75 | | 75 | | 75 | | 75 |

|  | Example 13 | Comparative Example 12 | Example 14 | Comparative Example 13 | Example 15 | Comparative Example 14 | Example 16 | Comparative Example 15 |
|---|---|---|---|---|---|---|---|---|
| B-1 | | | | | | | | |
| B-2 | | | | | | | | |
| B-3 | | | | | | | | |
| B-4 | | | | | | | | |
| B-5 | 25 | 25 | | | | | | |
| B-6 | | | 25 | 25 | | | | |
| B-7 | | | | | 25 | 25 | | |
| B-8 | | | | | | | 25 | 25 |
| A-1 | 75 | | 75 | | 75 | | 75 | |
| A-7 | | 75 | | 75 | | 75 | | 75 |

TABLE 7

|  | Example 9 | Comparative Example 8 | Example 10 | Comparative Example 9 | Example 11 | Comparative Example 10 | Example 12 | Comparative Example 11 |
|---|---|---|---|---|---|---|---|---|
| Specific gravity | 1.911 | 1.905 | 1.912 | 1.915 | 1.921 | 1.918 | 1.898 | 1.904 |
| Volume resistivity ($\Omega$ cm) | 0.005 | 0.021 | 0.003 | 0.007 | 0.0015 | 0.005 | 0.003 | 0.012 |
| Contact resistance ($\Omega$ cm$^2$) | 0.015 | 0.05 | 0.007 | 0.025 | 0.003 | 0.03 | 0.0079 | 0.095 |
| Thermal conductivity (W/mk) | 15.8 | 15.2 | 15.7 | 15.1 | 15.5 | 15.8 | 15.9 | 15.2 |
| Compression strength (MPa) | 64.2 | 65 | 69.8 | 68.2 | 65.8 | 65.5 | 67.4 | 66.3 |
| Flexural strength (MPa) | 35.6 | 32 | 36.1 | 34 | 35 | 35.2 | 34.6 | 35.1 |
| Flexural elasticity (MPa) | 12500 | 12400 | 12300 | 12500 | 12200 | 12300 | 11700 | 11800 |
| Gas permeability (cm$^2$/sec) | $6.3 \times 10^{-7}$ | $5.8 \times 10^{-7}$ | $6.4 \times 10^{-8}$ | $4.8 \times 10^{-8}$ | $6.5 \times 10^{-8}$ | $7.0 \times 10^{-8}$ | $6.8 \times 10^{-8}$ | $6.2 \times 10^{-8}$ |

TABLE 7-continued

|  | Example 9 | Comparative Example 8 | Example 10 | Comparative Example 9 | Example 11 | Comparative Example 10 | Example 12 | Comparative Example 11 |
|---|---|---|---|---|---|---|---|---|
| Heat resistance | ○ | ○ | X | X | Δ | Δ | ○ | ○ |
| Acid resistance | ○ | ○ | X | X | Δ | Δ | ○ | ○ |

|  | Example 13 | Comparative Example 12 | Example 14 | Comparative Example 13 | Example 15 | Comparative Example 14 | Example 16 | Comparative Example 15 |
|---|---|---|---|---|---|---|---|---|
| Specific gravity | 1.917 | 1.924 | 1.915 | 1.914 | 1.912 | 1.924 | 1.902 | 1.898 |
| Volume resistivity ($\Omega$ cm) | 0.002 | 0.014 | 0.0015 | 0.008 | 0.002 | 0.0086 | 0.0092 | 0.039 |
| Contact resistance ($\Omega$ cm$^2$) | 0.004 | 0.087 | 0.003 | 0.023 | 0.005 | 0.031 | 0.045 | 0.087 |
| Thermal conductivity (W/mk) | 15.5 | 14.8 | 15.6 | 14.2 | 16 | 15.7 | 14 | 13.2 |
| Compression strength (MPa) | 68.1 | 67.8 | 67.6 | 65.4 | 69.1 | 68.4 | 62.5 | 61.9 |
| Flexural strength (MPa) | 35.2 | 34.7 | 34.8 | 32.7 | 34.7 | 34.5 | 33.1 | 33.2 |
| Flexural elasticity (MPa) | 12500 | 12600 | 12000 | 12100 | 12100 | 12400 | 12500 | 12500 |
| gas permeability (cm$^2$/sec) | $4.7 \times 10^{-8}$ | $5.8 \times 10^{-8}$ | $8.4 \times 10^{-8}$ | $7.4 \times 10^{-8}$ | $3.6 \times 10^{-8}$ | $4.1 \times 10^{-8}$ | $6.3 \times 10^{-5}$ | $3.4 \times 10^{-5}$ |
| Heat resistance | ○ | ○ | ○ | ○ | ○ | ○ | ○ | ○ |
| Acid resistance | ○ | ○ | ○ | ○ | ○ | ○ | ○ | ○ |

*Thermal resistance: in air at 140° C. for 2,000 hours,
○: The reduction of strength after test is 20% or less.
Δ: The reduction of strength after test is from 20 to 50%.
X: The reduction of strength after test is 50% or more.
*Acid resistance: dipped in aqueous 5% sulfuric acid at 90° C. for 100 hours,
○: The reduction of strength after test is 20% or less.
Δ: The reduction of strength after test is from 20 to 50%.
X: The reduction of strength after test is 50% or more.

TABLE 8

|  | Example | | | | | Comparative Example | | |
|---|---|---|---|---|---|---|---|---|
|  | 2 | 17 | 18 | 19 | 20 | 16 | 17 | 18 |
| B-1 |  |  | 30 |  |  |  |  |  |
| B-2 |  |  |  | 30 |  |  |  |  |
| B-3 |  |  |  |  | 30 |  |  |  |
| B-4 | 30 | 30 |  |  |  | 30 | 30 | 30 |
| A-1 | 70 |  | 70 | 70 | 70 |  |  |  |
| A-4 |  | 70 |  |  |  |  |  |  |
| A-7 |  |  |  |  |  | 70 |  |  |
| A-8 |  |  |  |  |  |  | 70 |  |
| A-9 |  |  |  |  |  |  |  | 70 |

TABLE 9

|  | Example | | | | | Comparative Example | | |
|---|---|---|---|---|---|---|---|---|
|  | 2 | 17 | 18 | 19 | 20 | 16 | 17 | 18 |
| Specific gravity | 1.884 | 1.877 | 1.874 | 1.862 | 1.857 | 1.865 | 1.861 | 1.833 |
| Volume resistivity ($\Omega$ cm) | 0.004 | 0.005 | 0.0054 | 0.0071 | 0.0062 | 0.028 | 0.082 | 0.054 |
| Contact resistance ($\Omega$ cm$^2$) | 0.009 | 0.024 | 0.03 | 0.026 | 0.032 | 0.083 | 0.18 | 0.21 |
| Thermal conductivity (W/mk) | 11.8 | 12 | 10.2 | 10.4 | 11.5 | 11.2 | 9.8 | 12.3 |
| Compression strength (MPa) | 62 | 60 | 60.7 | 62 | 60.4 | 58.6 | 68 | 57 |
| Flexural strength (MPa) | 34 | 33 | 31.4 | 30.8 | 32.4 | 30.7 | 35 | 26 |
| Flexural elasticity | 9600 | 9400 | 9800 | 9400 | 9700 | 9400 | 11000 | 9800 |

TABLE 9-continued

| | Example | | | | | Comparative Example | | |
|---|---|---|---|---|---|---|---|---|
| | 2 | 17 | 18 | 19 | 20 | 16 | 17 | 18 |
| (MPa) Gas permeability (cm$^2$/sec) | 7.2 × 10$^{-9}$ | 6.5 × 10$^{-9}$ | 6.3 × 10$^{-8}$ | 5.4 × 10$^{-9}$ | 7.5 × 10$^{-9}$ | 7.2 × 10$^{-9}$ | 8.4 × 10$^{-8}$ | 5.0 × 10$^{-9}$ |

TABLE 10

| | Example | | | | | Comparative Example | | |
|---|---|---|---|---|---|---|---|---|
| | 2 | 17 | 18 | 19 | 20 | 16 | 17 | 18 |
| Temperature (° C.) | 120 | 120 | 180 | 120 | 120 | 120 | 120 | 120 |
| Spiral flow length (cm) | 42 | 38 | 40 | 45 | 39 | 6 | 7 | 8 |

It can be seen from Table 1 that when boron is added, the lattice spacing becomes narrow after the graphitization and the graphite obtained can have a high crystallinity. The cured product obtained from the electroconductive curable resin composition by using this graphite has a higher electroconductivity as compared with that in a case where graphite containing no boron is used. In particular, when the graphite used has a large tapping bulk density or a broad particle size distribution and a large particle size, the cured product can have still higher electroconductivity.

Accordingly, a sufficiently high electroconductivity is attained even if the amount of resin is increased, so that the formability or workability can be improved while maintaining the desirably high electroconductivity.

With respect to the formability or workability, the fluidity is further improved by using a graphite powder having a small aspect ratio. However, when a graphite powder having a particle size of 80 μm or more is present, the fluidity is decreased and formation failure occurs.

The composition using a novolak-type epoxy resin, a vinyl ester resin or a phenolic resin as the curable resin is improved in the acid resistance and heat resistance. However, when only a phenolic resin is subjected to the reaction, water is generated in the reaction and a large number of pores are formed in the cured product, and as a result, the gas permeability becomes poorer.

Industrial Applicability

The electroconductive curable resin composition according to the present invention can provide a cured product having an excellent electroconductivity, a high heat resistance, a good heat-radiating property and superior corrosion resistance. Therefore, the composition according to can be widely applied to the fields of materials in which conventional materials have been difficult to use, for example, various uses and parts such as in the fields of electronics, electric products, machine parts and vehicle parts. In particular, the composition is useful as a raw material for a separator of fuel cells such as solid polymer-type fuel cell.

What is claimed is:

1. An electroconductive curable resin composition comprising:
   (A) a graphite powder containing boron in the graphite crystal, wherein a part of carbon atoms constituting the graphite crystal are substituted by boron atoms, and
   (B) a curable resin and/or a curable resin composition, at a ratio of 20 to 99.9: 80 to 0.1 in terms of the mass ratio of the component (A) to component (B), provided that the sum of the mass ratios of the components (A) and (B) is 100.

2. An electroconductive curable resin composition comprising:
   (A) a graphite powder containing boron in the graphite crystal wherein a part of carbon atoms constituting the graphite crystal are substituted by boron atoms, and
   (B) a curable resin and/or a curable resin composition, and
   (C) vapor-phase process carbon fiber having a fiber diameter of 0.05–10 μm and a fiber length of 1–500 μm, and/or carbon nanotube having a fiber diameter of 0.5–100 nm and a fiber length of 0.01–10 μm.

3. An electroconductive curable resin composition according to claim 2, wherein the mass ratio of the sum of the component (A) and the component (C) to the component (B) (A+C:B) is 20 to 99.9:80 to 0.1, provided that the sum of the mass ratios of the components (A), (B) and (C) is 100.

4. An electroconductive curable resin composition according to claim 2 or 3, wherein the mass ratio of the component (A) to the component (C) is 60 to 99.9:40 to 0.1, provided that the sum of the mass ratios of the components (A) and (C) is 100.

5. An electroconductive curable resin composition according to claim 1, wherein the powder electric resistivity of the component (A) in the right angle direction is 0.06 Ωcm or less with respect to the applied pressure direction in a state where the graphite powder as the component (A) is pressed so as to provide a bulk density of the graphite powder of 1.5 g/cm$^3$.

6. An electroconductive curable resin composition according to claim 1, wherein the component (A) has an average particle size of 5 to 80 μm.

7. An electroconductive curable resin composition according to claim 1, wherein the component (A) is a graphite powder having a specific surface area of 3 m$^2$/g or less, an aspect ratio of 6 or less, a tapping bulk density of 0.8 g/cm$^3$ or more and a lattice spacing (Co value) of 6.745 Å or less.

8. An electroconductive curable resin composition according to claim 1, wherein the component (B) comprises at least one resin selected from a phenolic resin, an unsaturated polyester resin, an epoxy resin, a vinyl ester resin and an allyl ester resin; and
   a curing agent.

9. An electroconductive curable resin composition according to claim 8, wherein the component (B) comprises an epoxy resin and a phenolic resin.

10. An electroconductive curable resin composition according to claim 9, wherein the epoxy resin comprises a cresol novolak epoxy resin and the phenolic resin comprises a novolak phenolic resin.

11. An electroconductive curable resin composition according to claim 8, wherein the component (B) comprises a vinyl ester resin and/or an allyl ester resin, at least one monomer selected from allyl ester monomer, acrylic acid ester monomer, methacrylic acid ester monomer and styrene monomer; and a radical polymerization initiator.

12. An electroconductive curable resin composition according to claim 11, wherein the vinyl ester resin is a novolak vinyl ester resin.

13. An electroconductive curable resin composition according to claim 1, wherein the component (A) is a graphite powder containing from 0.05 to 5.0 mass % of boron.

14. An electroconductive cured product obtained by curing an electroconductive curable resin composition according to claim 1, which has a volume resistivity of $2 \times 10^{-2}$ $\Omega$cm or less, a contact resistance of $2 \times 10^{-2}$ $\Omega$cm$^2$ or less and a thermal conductivity of 1.0 W/m·K or more.

15. A process for producing an electroconductive cured product according to claim 14, which comprises forming the cured product by any one of compression molding, transfer molding, injection molding and injection-compression molding.

16. A separator for fuel cells, obtained by curing an electroconductive curable resin composition according to claim 1 which is an electroconductive curable resin composition comprising from 50 to 95 mass % of the component (A) (or, from 50 to 95 mass % of the sum of the component (A) and the component (C), if any), the separator having a volume resistivity of $2 \times 10^{-2}$ $\Omega$cm or less, a contact resistance of $2 \times 10^{-2}$ $\Omega$cm$^2$ or less, a thermal conductivity of 1.0 W/m·K or more and a gas permeability of $1 \times 10^{-6}$ cm$^2$/sec or less.

17. A process for producing a separator for fuel cells, which comprises forming a separator for fuel cells by any one of compression molding, transfer molding, injection molding and injection-compression molding, the separator being obtained by curing an electroconductive curable resin composition according to claim 1 which is an electroconductive curable resin composition comprising from 50 to 95 mass % of the component (A) (or, from 50 to 95 mass % of the sum of the component (A) and the component (C), if any), and the separator having a volume resistivity of $2 \times 10^{-2}$ $\Omega$cm or less, a contact resistance of $2 \times 10^{-2}$ $\Omega$cm$^2$ or less, a thermal conductivity of 1.0 W/m·K or more and a gas permeability of $1 \times 10^{-6}$ cm$^2$/sec or less.

18. An electroconductive curable resin composition according to claim 1, wherein the bonding between the carbon atoms in the graphite crystal and the boron atoms substituting for carbon atoms in the graphite crystal comprises a covalent bond or an ionic bond.

* * * * *